United States Patent [19]

Bildstein et al.

[11] 4,374,386

[45] Feb. 15, 1983

[54] FORCE-TEMPERATURE STABILIZATION OF AN ELECTROMAGNETIC DEVICE

[75] Inventors: Carl R. Bildstein, Lafayette; Harry P. Heibein, Longmont; Harlan P. Mathews, Louisville, all of Colo.

[73] Assignee: International Business Machines Corporation, Armonk, N.Y.

[21] Appl. No.: 264,379

[22] Filed: May 15, 1981

[51] Int. Cl.$^3$ .............................................. G01D 15/18

[52] U.S. Cl. ........................................ 346/75; 361/152

[58] Field of Search .................. 346/75; 361/160, 169, 361/203, 209, 152

[56] References Cited

U.S. PATENT DOCUMENTS 3,787,882 1/1974 Fillmore et al. ...................... 346/75

4,217,594 8/1980 Meece et al. ......................... 346/75

*Primary Examiner*—Stafford D. Schreyer

*Attorney, Agent, or Firm*—Homer L. Knearl

[57] ABSTRACT

An ink jet pump is switched from a mechanically off or idle state to a mechanically on or active state with no drift in pressure output by maintaining the pump at the same point in its force-temperature characteristic when it is on and off. This is accomplished by driving the pump in both the active and idle states with signals that dissipate the same amount of power in the pump. The frequency of the idle state signal is high enough that the pump can not mechanically respond. The power dissipations in the active and idle states are matched by adjusting the current build-up and current decay through the coil of the pump during the idle state. When the RMS current through the coil in the active state equals the RMS current in the idle state, the power dissipations are matched.

13 Claims, 3 Drawing Figures

FORCE-TEMPERATURE STABILIZATION OF AN ELECTROMAGNETIC DEVICE

DESCRIPTION

1. Field of the Invention

This invention relates to stablizing the force supplied by an electromagnetic device as the device switches from an idle state to an active state. More particularly, the invention relates to driving a solenoid in a manner such that it is always in the stable portion of its force-temperature characteristic curve whether or not it is producing an operative force. One application of the invention is in the area of small pumps that must provide very stable fluid pressures immediately when the pump is activated. One example is an ink pump for continuous flow ink jet printers.

2. Background Art

It is well known that the force provided by an electromagnetic device varies as the device heats up. This is due to the change in permeablility of the magnetic material or the change in resistance of the coils in the device caused by the change in temperature. This problem has been addressed in the past by sensing the temperature of or the force from the device and adjusting the drive signal to the device to compensate for the force-temperature characteristic of the device. Alternatively, the problem has been solved by maintaining the temperature of the device constant or by providing matched coils in the device with opposite force-temperature characteristics.

U.S. Pat. No. 2,988,673 issued to Harkins is an example of adjusting the drive signal to the device to maintain constant force. The Harkins patent teaches a measurement solenoid with a position sensor and controls the drive signal applied to the solenoid to maintain the solenoid actuator at a balanced position as the solenoid warms up. Harkins uses the solenoid to measure the force pulling on its actuator. The force is measured by measuring the magnitude of the drive signal required to keep the solenoid actuator in a predetermined position. Since the drive signal is adjusted for the force-temperature characteristic of the device, Harkins senses the temperature of the solenoid and corrects his drive signal measurement.

U.S. Pat. No. 3,939,403 issued to Stassart is an example of maintaining the temperature of a coil constant. The coil is a measuring coil, and the objective of the invention is to maintain the characteristics of the coil constant by controlling its temperature. Stassart provides two coils intertwined with the measuring coil. The two coils are matched and oppositely driven so that they have no electro-magnetic effect on the measuring coil. They are connected in a temperature sensing and drive signal control loop. As the temperature of all the coils changes, the change is sensed, and the drive to the matched coils is changed to bring the temperature back to a predetermined constant value.

Compensating coils in an electromagnetic device is the subject of U.S. Pat. No. 3,843,945 issued to Koning. Each activating coil is supplemented by a compensating coil with a different number of turns and a different temperature coefficient of resistance. The coils are connected in parallel so that the current entering each coil varies as the temperature changes. By appropriate choice of winding materials and numbers of turns of the coils, the force of the device remains independent of temperature change.

In continuous flow ink jet printers, the velocity of the ink stream is controlled by changing the drive to the ink pump to change the pressure of the ink fluid in the print head. U.S. Pat. No. 3,787,882 issued to Fillmore et al. teaches sesnsing the temperature and ink pressure at the ink pump and adjusting the pump drive in order to maintain the ink stream velocity constant. This works very well, but is a complex and relatively expensive system.

The Fillmore et al. U.S. Pat. No. 3,787,882 also teaches measuring velocity of the ink drops directly and adjusting the drive to the ink pump to maintain constant velocity. Another U.S. Pat. No. 4,217,594 issued to Meece et al. also teaches a technique for measuring ink drop velocity and adjusting pump drive. Both of these velocity-servo techniques can only be used when the ink jet printer is not printing. When printing, such systems must relay on the pump not drifting in its pressure output before the next velocity-servo adjustment.

The pumps do not significantly drift in pressure output once they reach their operating temperature. However, if there is significant idle time, when the pump is off, between printing operations, the pump output may not be stable between ink drop velocity-servo operations. In such cases, it is necessary to wait for the pump to stabilize or to use the more expensive temperature and pressure servo controls taught in the Fillmore et al. patent. Temperature and pressure servo controls can be used during a printing operation.

SUMMARY OF THE INVENTION

It is the object of this invention to stabilize the force output of electromagnetic devices even though they have significant periods of idle time between active operations.

It is also the object of this invention to stablizie an ink pump in an ink jet printer so that its pressure output does not drift between ink velocity servo operations even though there is substantial idle time between printing operations.

In accordance with this invention the above objects are accomplished by driving the coil of the electromagnetic device at a first frequency during active operation and at a second frequency during idle. The second frequency is chosen so that it exceeds the operative mechanical frequency of the electromagnetic device causing the device to lock up and be in a mechanical idle state. Further, the first and second drive signals are chosen so that the RMS current through the coil dissipates the same power in the electromagnetic device whether it is active or in the idle state. This will maintain the device at the same point on its force-temperature characteristic curve.

The power dissipation produced by the second frequency signal may be adjusted in at least two ways. When driven by the second frequency signal, the rise and fall of current through the coil may be controlled by changing the resistance path during current build-up or decay in the coil or by changing the duty cycle of the second frequency signal. In either case, the power dissipated during idle can be adjusted to match the power dissipated during active operation.

In addition to maintaining the pump at a stable operating point, there are a number of other advantages with our invention. First, the invention provides stable operation when switching between active and idle states no matter what operating point is selected during active operation. Also, since the pump is always electrically driven, thermal stresses in the drive circuitry are reduced because it is not cycling on and off. Finally, in an ink system where the ink flow is cutoff by a valve during idle state, the pump is not pumping against a deadhead. The pump is mechanically off during the idle state. This saves a great deal of mechanical wear.

DETAILED DESCRIPTION

Figure 1:
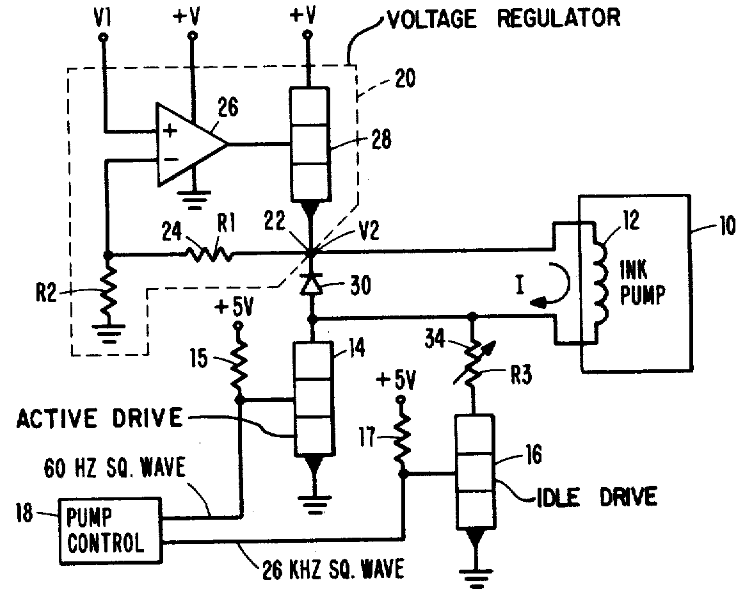
FIG. 1 shows the preferred embodiment of the invention where the electromagnetic device is an ink pump and the power dissipated during the idle state is controlled by providing a different resistance path in each half cycle of the drive signal during the idle state.

Referring now to FIG. 1, the preferred embodiment of the invention is shown. The electromagnetic device being controlled is an ink pump 10 with a solenoid actuation coil 12. The pump is simply a solenoid with its actuator connected to a diaphragm or bellows in a pumping cavity. Examples of such pumps are shown in FIG. 5 of the previously referred to Fillmore et al. U.S. Pat. No. 3,787,882 and FIG. 2 of the previously referred to Meece et al. U.S. Pat. No. 4,217,594.

When the pump is in an active state pumping ink, it is controlled by a 60 Hz signal applied to transistor 14. When the pump is in an idle state, it is controlled by a 26 KHz signal applied to transistor 16. As will be explained hereinafter, the 26 KHz frequency is far enough beyond the natural frequency of the ink pump mechanism that the pump locks up.

Switching ink pump 10 between active and idle states is controlled by the pump control 18. In the active state, control 18 holds transistor 16 off and supplies a 60 Hz signal to transistor 14. The 60 Hz signal switches transistor 14 on and off. Current through resistor 15 saturates transistor 14 when it is on. This same current is shunted away from transistor 14 through pump control 18 when the transistor is off. Control 18 holds transistor 14 off and turns on the 26 KHz signal to transistor 16 during idle state of the ink pump. Current through resistor 17 saturates transistor 16 when it is on. When transistor 16 is off current through bias resistor 17 is shunted away through pump control 18.

Voltage V2 controls the operating point of the pump and is provided by a voltage regulator circuit 20. Voltage V2 is referenced to the voltage V1, and V1 is the control voltage that is set to control ink pressure and thus ink velocity in the printer. V2 is referenced to V1 by feedback from node 22 through resistor 24 to operational amplifier 26. The output of operational amplifier controls transistor 28. As is well known, voltage V2 at node 22 is given by the expression:

$$V2 = V1\,(1 + R1/R2).$$

Figure 2:
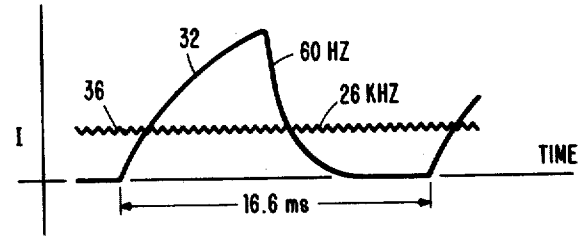
FIG. 2 is a plot of the current through the electromagnetic device during the active state and during the idle state.

When the ink pump 10 is being operated at 60 Hz by transistor 14, transistor 14 is turned on and off every half cycle of the 60 Hz signal. When transistor 14 is on (saturated), diode 30 is back biased. With transistor 14 on and diode 30 back biased, the current I in coil 12 builds-up because of drive voltage V2. When transistor 14 is cutoff, diode 30 is conducting, and current I decays through diode 30. The time constant for the decay of the current I is controlled by the inductance and the inherent resistance in coil 12 (and the very small forward-bias resistance of diode 30). Waveform 32 in FIG. 2 shows the cyclic current I through coil 12 when the 60 Hz signal is driving the ink pump 10.

When pump control 18 turns off transistor 14 and applies the 26 KHz signal to transistor 16, the ink pump reverts to the idle mechanical state. In the idle state, the actuator of the solenoid does not move, and the pump stops. The 26 KHz signal guarantees that the solenoid actuator will lock up. Generally, a much lower frequency may be utilized. In the case of the ink pump diagrammed in FIG. 2 of U.S. Pat. No. 4,217,594, it has been found that a 1 KHz idle frequency signal is sufficient to lock up the solenoid actuator and stop the pump operation.

For any spring and mass system such as the pump, it is possible to calculate the natural frequency of the system. If such a system is driven at a frequency many times the natural frequency, the device essentially stops. The frequency at which the device no longer produces significant motion depends on the spring constant, the moving mass and the damping characteristic of the electromagnetic device used. For the pump diagrammed in FIG. 2 of U.S. Pat. No. 4,217,594, the pump locked up when driven at a frequency about 20 times the natural frequency.

When the pump 10 is controlled by the 26 KHz signal applied to transistor 16, the current flow in the circuit is similar to that previously described for the 60 Hz operation with transistor 14. However, this time the cycle is sufficiently short that the current I in the coil 12 never decays back to zero when transistor 16 is off. Thus, current I will settle at some steady state level having a DC component. The steady state level is reached when current build-up in the coil matches current decay in the coil.

During the positive half of 26 KHz cycle transistor 16 is on and current I builds-up through coil 12. The time constant of the current rise is controlled by the inductance of the coil 12 and the resistance value R3 of variable resistor 34. At this time, diode 30 is back biased. When transistor 16 turns off, the current I in coil 12 decays through diode 30. The time constant is again controlled by the coil inductance and the inherent resistance in the coil (and diode 30). However, before the current I decays to zero, the next positive half of the 26 KHz signal turns on transistor 16.

Waveform 36 in FIG. 2 shows the current I when the pump is driven at 26 KHz. The 26 KHz current I reaches a steady level having a DC component, and the magnitude of this DC level may be adjusted by setting the resistance R3 of variable resistor 34. R3 controls the rise time-constant for build-up of current I through coil 12 when transistor 16 is on during the positive half of the 26 KHz signal.

The power dissipated in the ink pump during the active and idle states is proportional to the square of the RMS values of the currents shown as waveforms 32 (active) and 36 (idle) in FIG. 2. Therefore, to maintain the temperature of the solenoid in the ink pump 10 constant from active to idle state the RMS value of the currents should be the same. As mentioned above, the DC level of the waveform 36 may be adjusted by adjusting the resistance value R3 of resistor 34. In this way, waveform 36 may be moved up and down until its RMS current equals the RMS current of waveform 32.

Figure 3:
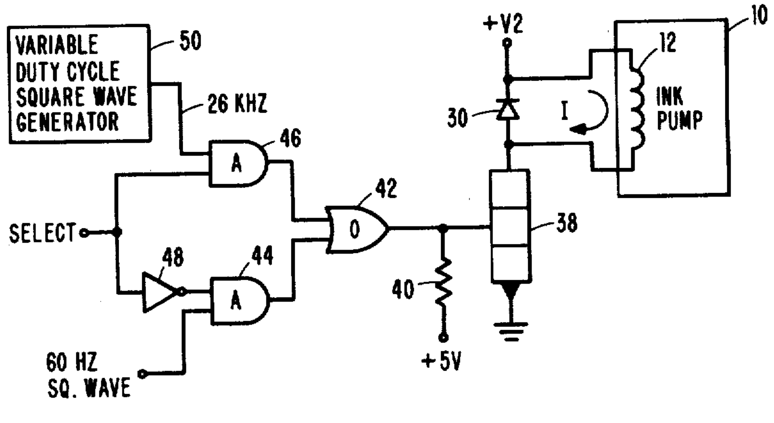
FIG. 3 shows an alternative embodiment of the invention where the power dissipated in the electromagnetic device during the idle state is controlled by the duty cycle of the drive signal during the idle state.

Referring now to FIG. 3, an alternative embodiment of the invention is shown where the power dissipation in the idle state is matched to the active state by adjusting the duty cycle of the idle frequency signal driving the coil 12. The ink pump 10, coil 12, diode 30 and regulated drive voltage V2 are the same as previously described for FIG. 1. Current I through the coil 12 is controlled in FIG. 3 by a single transistor 38. Transistor 38 may be switched either by the 60 Hz square wave signal during active operation of the pump 10 or by the 26 KHz square wave signal during idle state condition of the pump 10. Resistor 40 and its 5 volt bias voltage supply current to saturate transistor 38 when it is on. When the transistor is off the current through resistor 40 is shunted through a transistor (not shown) in OR 42.

The control signal to switch transistor 38 on and off is provided through OR 42 and AND 44 when transistor 38 is operated at the 60 Hz frequency. Transistor 38 is controlled through OR 42 and AND 46 when operated at the 26 KHz frequency. Selection of 60 Hz or 26 KHz operations is provided by the select signal applied directly to AND 46 or inverted by inverter 48 and applied to AND 44. A square wave generator 50 can be set to different duty cycles. Duty cycle refers to the time duration of the high level and low level portions of the 26 KHz square wave.

In operation, when the select signal is low, AND 46 is inhibited, and inverter 48 will enable AND 44. AND 44 then passes the 60 Hz square wave signal through OR 42 to transistor 38. This corresponds to the active pump operation and is substantially the same operation as previously described for transistor 14 driving the circuit in FIG. 1.

When the select signal is present, AND 44 is inhibited, and AND 46 is enabled. AND 46 then passes the 26 KHz square wave via OR 42 to transistor 38. During the high portion of the 26 KHz square wave, transistor 38 is on, and current I builds-up in coil 12. During the low level portion of the 26 KHz square wave, transistor 38 turns off and the current I decays through diode 30. The time constant of the decay is dependent on the inductance of coil 12, the resistance of coil 12 and the forward bias resistance of diode 30. The current I in FIG. 3 is the same as that for FIG. 1 and is shown in FIG. 2.

To adjust the DC level of the 26 KHz current I, the duty cycle of the square wave generator 50 is adjusted. The greater the proportion of the cycle that is at the high level, the greater the DC component will be in the I waveform 36 (FIG. 2). In effect the high level of the 26 KHz signal controls the length of time that current builds-up in coil 12, while the low level controls the length of time the current decays away in coil 12. Thus by controlling the ratio of build-up time to decay time, the DC level in waveform 36 of FIG. 2 may be set to a desired level.

As described earlier, the DC level is adjusted until the power dissipated in the pump by waveform 36 is equal to the power dissipated by waveform 32. This matched condition is equivalent to the RMS current of waveform 36 being equal to the RMS current of waveform 32.

To set the resistance R3 in FIG. 1 or the duty cycle of generator 50 in FIG. 3, the RMS current through coil 12 is measured during active and idle states. Resistance R3 or the duty cycle of generator 50 are then adjusted until RMS currents through coil 12 during active and idle states are equal. Then the resistance or duty cycle is set and will not be changed thereafter. Even if the operating point of the pump changes due to a change in the voltage V2, no further adjustment of R3 or the duty cycle is required. This is because V2 is used to drive the pump in both the active and idle states.

Although both embodiments of the invention adjust the idle state current in coil 12 to match the active and idle state power dissipations, it will be appreciated by one skilled in the art that the current I during active state could be adjusted to match the power dissipations. This could most easily be done by providing a variable duty cycle square wave generator in FIG. 2 for the 60 Hz drive signal.

Also it will be appreciated by one skilled in the art that FIG. 1 might be modified to set the decay time-constant rather than the rise time-constant. This can be accomplished by moving resistor 34 to a position in series with diode 30 between diode 30 and node 22 in FIG. 1. In addition, resistor 34 should then be bypassed or short-circuited when the pump is in the active state. This could be accomplished by placing a silicon control rectifier switched by pump control 18 in parallel with resistor 34.

While we have illustrated and described the preferred embodiments of our invention, it is understood that we do not limit ourselves to the precise constructions herein disclosed and the right is reserved to all changes and modifications coming within the scope of the invention as defined in the appended claims.

What is claimed is:

1. Apparatus for maintaining an electromagnetic device at substantially the same force-temperature characteristic operating point whether the device is in an active or idle state, said apparatus comprising:

first means for driving said device with a first electrical signal at an active frequency within the operative range of said device;

second means for driving said device with a second electrical signal at an idle frequency outside the operative range of said device;

means for electrically connecting said first driving means to said device during the active state and said second driving means to said device during the idle state;

means for controlling power of the second electrical signal supplied to said device by said second driving means whereby the power so supplied is substantially matched to the first electrical signal power supplied said device by said first driving means and the force-temperature operating point of said device remains the same from idle state to active state.

2. The apparatus of claim 1 wherein said second driving means comprises:

means for supplying a drive voltage to said device;

means for switching magnitude of current flow through said device whereby current builds-up and decays in said device during each cycle of drive at the idle frequency.

3. The apparatus of claim 2 wherein said controlling means comprises:

means for setting a steady-state DC current level in said device when said second driving means is electrically connected to said device.

4. The apparatus of claim 3 wherein said setting means comprises:

means for providing a first rate of current build-up in said device;

means for providing a second rate of current decay in said device.

5. The apparatus of claim 3 wherein said setting means comprises:

means for generating an idle frequency signal with a predetermined duty cycle to control proportion of time in each idle frequency cycle that said switching means switches current flow through said device between current build-up and current decay.

6. Control apparatus for an electromagnetic device for maintaining the device at a point in its force-temperature characteristic which is the same whether the device is in an active state or an idle state, said apparatus comprising:

means for electrically driving the device at a mechanically operative frequency during its active state and at a mechanically inoperative frequency during its idle state;

means for adjusting electrical power dissipated in the device during the active or idle state whereby temperature of the device remains constant and the device remains at the same point in its force-temperature characteristic whether the device is in an active or idle state.

7. The apparatus of claim 6 wherein said adjusting means comprises:

means for controlling current flow through said device in each half cycle of drive when said device is driven at the idle frequency.

8. The apparatus of claim 7 wherein said controlling means comprises:

means for switching the current flow through two different resistance paths during respective half cycles of drive when said device is driven at the idle frequency.

9. The apparatus of claim 6 wherein said adjusting means comprises:

means for generating different time periods of current flow through the device in each half cycle of drive when said device is driven at the idle frequency.

10. In an ink supply system for an ink jet printer having an ink pump for pressurizing the ink so that ink jets out of a printer nozzle, a pump control for switching a pump drive between active and idle states when the printer is operative and inoperative respectively and a first driving means responsive to the pump control during the active state for electrically driving the pump at an operative frequency; the improvement comprising:

second driving means responsive to said pump control during the idle state for electrically driving said pump at an inoperative frequency outside the mechanical response capability of the pump;

means for controlling an electrical power supplied to said pump by said second driving means whereby the power so supplied is substantially matched to an electrical power supplied said pump by said first driving means.

11. The apparatus of claim 10 wherein said second driving means comprises:

means for switching at the inoperative frequency a rate of electrical current flow through said pump whereby current builds-up and decays in said pump during the idle state even though the pump is not mechanically responsive.

12. The apparatus of claim 11 wherein said controlling means comprises:

means for setting different rates of current flow through the pump in each half cycle of current flow during the idle state.

13. The apparatus of claim 11 wherein said controlling means comprises:

means for generating different time periods of current flow through the pump in each half cycle of current flow during the idle state.

* * * * *